United States Patent [19]
Bullock et al.

[11] 4,423,478
[45] Dec. 27, 1983

[54] PHASE CONTROLLED REGULATED POWER SUPPLY

[75] Inventors: Randolph A. Bullock, Rochester; Lawrence J. Mason, Webster, both of N.Y.

[73] Assignee: Xerox Corporation, Stamford, Conn.

[21] Appl. No.: 285,236

[22] Filed: Jul. 20, 1981

[51] Int. Cl.³ .............................................. G05F 1/64
[52] U.S. Cl. ..................................... 363/89; 307/356; 315/159; 315/272; 323/238; 323/300
[58] Field of Search ....................... 307/297, 355, 356; 315/151, 158, 159, 272, 287; 323/237, 238, 242, 299, 300, 303, 320, 321, 326; 363/89, 127

[56] References Cited

U.S. PATENT DOCUMENTS

| | | | |
|---|---|---|---|
| 3,210,647 | 10/1965 | Dyke | 323/21 |
| 3,456,155 | 7/1969 | Buchanan | 323/303 X |
| 3,670,202 | 6/1972 | Paine et al. | 315/297 |
| 3,952,242 | 4/1976 | Ukai | 323/21 |
| 4,042,856 | 8/1977 | Steigerwald | 323/299 X |
| 4,101,808 | 7/1978 | Flint | 315/151 |
| 4,183,082 | 1/1980 | Ishii | 323/303 X |

FOREIGN PATENT DOCUMENTS

| | | | |
|---|---|---|---|
| 55-20586 | 2/1980 | Japan | 323/300 |
| 55-66274 | 5/1980 | Japan | 323/299 |

OTHER PUBLICATIONS

Schulz, "Power Control Technique", IBM Technical Disclosure Bulletin, vol. 20, No. 8, Jan. 1978, pp. 2945-2947.

Quinn, Halsey P., "Power Regulator for a Resistive Load", Xerox Disclosure Journal, vol. 3, No. 6, Nov./Dec. 1978, p. 453.

Primary Examiner—A. D. Pellinen

[57] ABSTRACT

A circuit is provided for regulating the application of power to a load which is relatively insensitive to rapid power fluctuation of the type exemplified by typical AC line sources. In one embodiment, an AC line source is applied at a controlled rate to a tungsten lamp whose operation is controlled by a transistor switching network. The transistor operation, in turn, is controlled by comparing a portion of the rectified signal with a signal proportional to the light output of the lamp.

4 Claims, 4 Drawing Figures

PHASE CONTROLLED REGULATED POWER SUPPLY

BACKGROUND AND PRIOR ART STATEMENT

The present invention relates generally to the regulation of power to certain loads which are insensitive to rapid fluctuation of power and, more particularly to a system which controls the conduction period so that power to a load, is applied and removed, at a controlled (slowed-down) rate.

Systems which include application of ac line voltage to loads such as heavy filament tungsten lamps, heater circuits or the like, include components which compensate for the inability of these loads to respond to the rapid power fluctuation of the line source. Various voltage regulation techniques are known in the art; the most commonly being to electrically apply and remove the load power by selectively controlling the operation of a silicon-controlled-rectifier (SCR). The SCR operation, in turn, is usually controlled by using an optical feedback circuit. Systems of this type are disclosed in U.S. Pat. Nos. 3,210,647, 3,952,242 and 3,670,202.

Each of these systems, however, encounters the problem of compensating for the effects of electromagnetic interference (EMI) caused by the rapid switching times associated with SCRs (typically 1 to 2 $\mu$s). The EMI effects are manifested in fast rise times in the load voltage which must be eliminated. One method of eliminating the EMI effect is to insert filters between the SCR and the load as shown, for example, in U.S. Pat. No. 3,670,202. This represents an additional, and costly, component to these systems and increases their complexity. The use of filters also creates an undesireable AC ground leakage current which must be limited for safety reasons.

The present invention is directed to a power regulation system which applies and removes power from a load "slowly", thereby reducing the EMI and eliminating the need for filters. A transistor, rather than an SCR, is then used to control the rate at which power is applied to the load. According to one aspect of the invention, there is provided: rectifier means for converting alternating current power to full wave rectified direct current power; means for supplying said rectified power to the load; means for generating a first output signal $V_c$ representative of the radiant energy of said load; means for comparing said output $V_c$ with a portion of said rectified dc power to produce a second output $V_o$; a transistor switching circuit coupled between said comparing means and said load, said switching circuit being adapted to be turned on and off at a rate determined by the rate of change of the level of output $V_o$; whereby said load is turned on and off consistent with the switching rate of said transistor switching circuit.

DRAWINGS

DESCRIPTION

Figure 1:
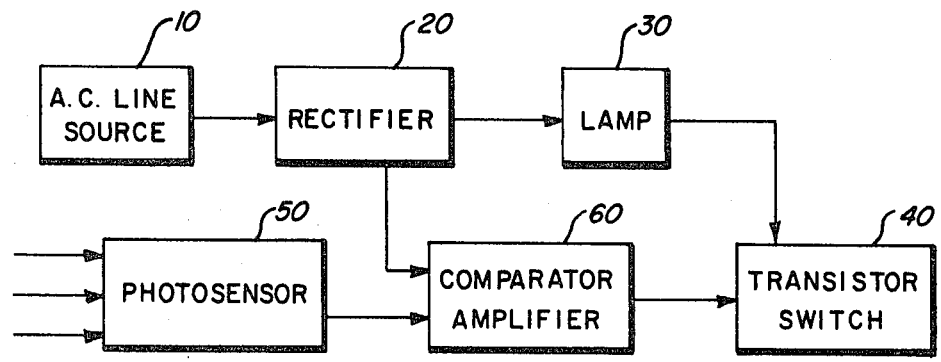
FIG. 1 is a block diagram of an embodiment of the present invention.

Referring to FIG. 1, a phase-controlled, regulated power supply circuit is shown to consist of a number of functional components 10, 20, 30, 40, 50, 60. A conventional ac power source 10 is connected to rectifier 20. Full wave rectified dc signals are applied across lamp 30 and transistor switch 40. The operation of transistor switch 40 is controlled by a feedback loop consisting of photosensor 50 and comparator-amplifier 60. Photosensor 50 generates an output signal proportional to the intensity of light emanating from lamp 30. The signal is amplified and compared, in comparator-amplifier 60, with a fraction of the rectifier 20 output. The output of comparator-amplifier 60 is a voltage signal which changes at a rate which controls the operation of transistor switch 40, and, hence of lamp 30.

Figure 2:
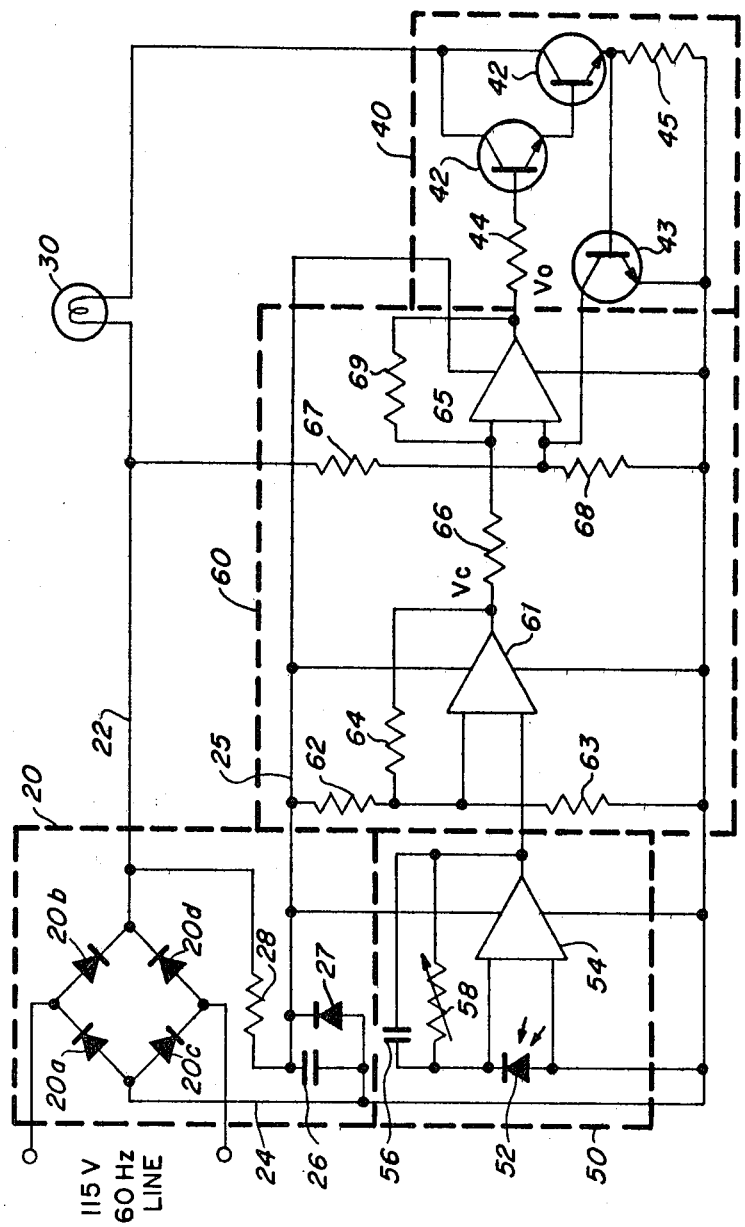
FIG. 2 is a detailed schematic diagram of a first embodiment of the FIG. 1 system.

FIG. 2 is a specific embodiment of the circuit shown in FIG. 1. A 115v 60 Hz line voltage from source 10 is applied to conventional dc bridge rectifier 20 which includes four diodes 20a, 20b, 20c and 20d, connected as shown. Rectifier 20 converts the applied ac power to full wave rectified dc power across output leads 22, 24. The output on lead 22 has a 120 cps ripple component which is filtered by a circuit comprising capacitor 26, zener diode 27 and resistor 28. This filtered dc voltage is then used to provide power, along lead 25 to the amplifier circuits and a biasing signal to circuit 60, as will be seen.

The full wave, rectified dc output on lead 22 is applied to a 100W, 100V tungsten lamp 30 in series with transistor switch 40 consisting of Darlington transistor 42 and resistors 44, 45. The function of transistor 43 is to provide an overcurrent shutdown of the output to protect transistor pair 42 during warmup of the lamp. Photosensor circuit 50 which monitors the light output of lamp 30, includes a photodiode 52, and operational amplifier 54. Photodiode 52 generates an output current proportional to the irradiance from lamp 30 impinging thereon. Capacitor 56 filters out any ripple components. Amplifier 54 provides a current-to-voltage conversion of the photodiode signal and its output signal $V_L$ is proportional to the input photodiode signal and the gain of the circuit (controlled by potentiometer 58).

Voltage signal $V_L$ is applied to the positive input of operational amplifier 61 in amplifier-comparator circuit 60. The rectified, filtered output from lead 22 is applied to the negative input of amplifier 61 across a voltage divide comprising resistors 62, 63. Amplifier 61 output signal, $V_c$, is proportional to the input signal from amplifier 54 and the gain of the circuit as set by resistor 64. For the selected component values, amplifier 61 provides a non-inverted voltage output with a gain of approximately 10.

The voltage output, $V_c$, of amplifier 61, is applied to the negative input of operational amplifier 65 across resistor 66. This input is compared with a fraction of the rectified line voltage on lead 22, applied to amplifier 65 across a voltage divider consisting of resistors 67, 68. The output $V_o$ of amplifier 65 is therefore proportional to the input signal from amplifier 61 and the gain as set by resistor 69. For the indicated component values, amplifier 65 provides a non-inverted voltage output $V_o$ with a gain of approximately 11. This signal is applied to transistor switch circuit 40. As will be seen, the rate at which output $V_o$ changes (along with the value of resistor 44 and the gain of transistor 42) affects the rate at which the lamp current changes.

Figure 3:
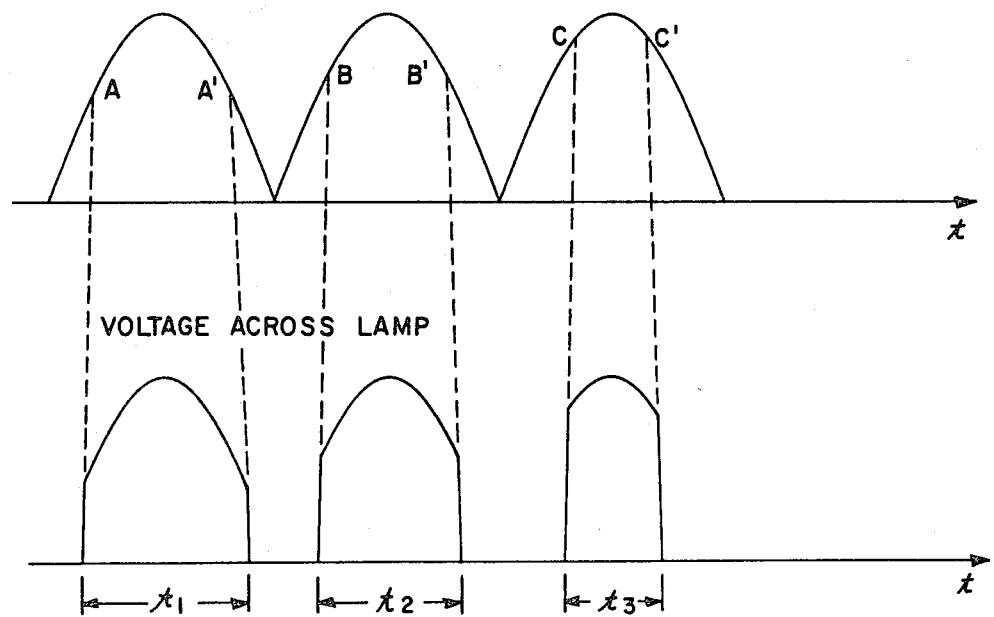
FIG. 3 represents line voltage and load waveform levels plotted against time.

In operation, Darlington transistor pair 42 will be biased into conduction whenever the value of $V_o$ goes positive. Output $V_o$ will go positive whenever the input to the positive terminal of amplifier 65 is sufficiently positive with respect to the input $V_c$ at the negative terminal. At initial turn-on conditions, $V_c$ will be a minimal value since current is not flowing through lamp 30 and photodiode 52 is not detecting any light output. Referring to FIG. 3, under these conditions, $V_o$ will go positive at some point A on the full wave waveform at some time value k(t) after full power application. Since $V_o$ goes positive, transistor 42 is biased into conduction and power is applied to lamp 30. Transistor 42 will continue to conduct until the bias voltage to amplifier 65 drops below the preset value at A', at which point transistor 42 is turned off. Lamp 30 has therefore been energized for some period $t_1$ and has produced a light component which is detected by photodiode 52. The amplified signal will be present as signal $V_c$ at the negative input of amplifier 65. Amplifier 65 will therefore not go positive until it sees a greater line voltage input B at the positive terminal. Transistor 42 will then be turned on and conduct during a shorter time period $t_2$ terminated at point B', where the line voltage drops below the value of $V_c$. Again, the photosensor signal generates a signal proportional to the increased light output of lamp 30. It can then be appreciated that with the application of each successive line voltage waveform, up to the point where equilibrium conditions are achieved, $V_c$ will continue to increase causing $V_o$ to go positive at greater values of the applied line voltage. Waveform C illustrates a typical waveform for normal lamp operating conditions for the circuit shown in FIG. 2, and with a current gain of 200 for transistor 42, lamp current will increase from 0 to 1 ampere when the line voltage has a net change of approximately 10 volts. The time required for the line voltage to change by 10 volts depends on the shape of the line voltage waveform but at the steepest part, the time required for a 10 volt change is 165µ sec.

Specific values for the components shown in FIG. 2 are listed below:

| FIG. 2 COMPONENTS | |
|---|---|
| Diodes | 20a, 20b, 20c, 20d IN 4003 |
| | 27 15V |
| Amplifiers | 54, 61, 65 ULM 324 |
| Transistors | 42 TIP 160 |
| | 43 2N 3904 |
| Capacitors | 26 20 µf |
| | 56 0.72 µf |
| Resistors | 28 58K, 2W |
| | 44 1K |
| | 45 0.1Ω, 1W |
| | 58 1M |
| | 62 15K |
| | 63 33K |
| | 64 100K |
| | 66 20K |
| | 67 430K |
| | 68 20K |
| | 69 220K |

Figure 4:
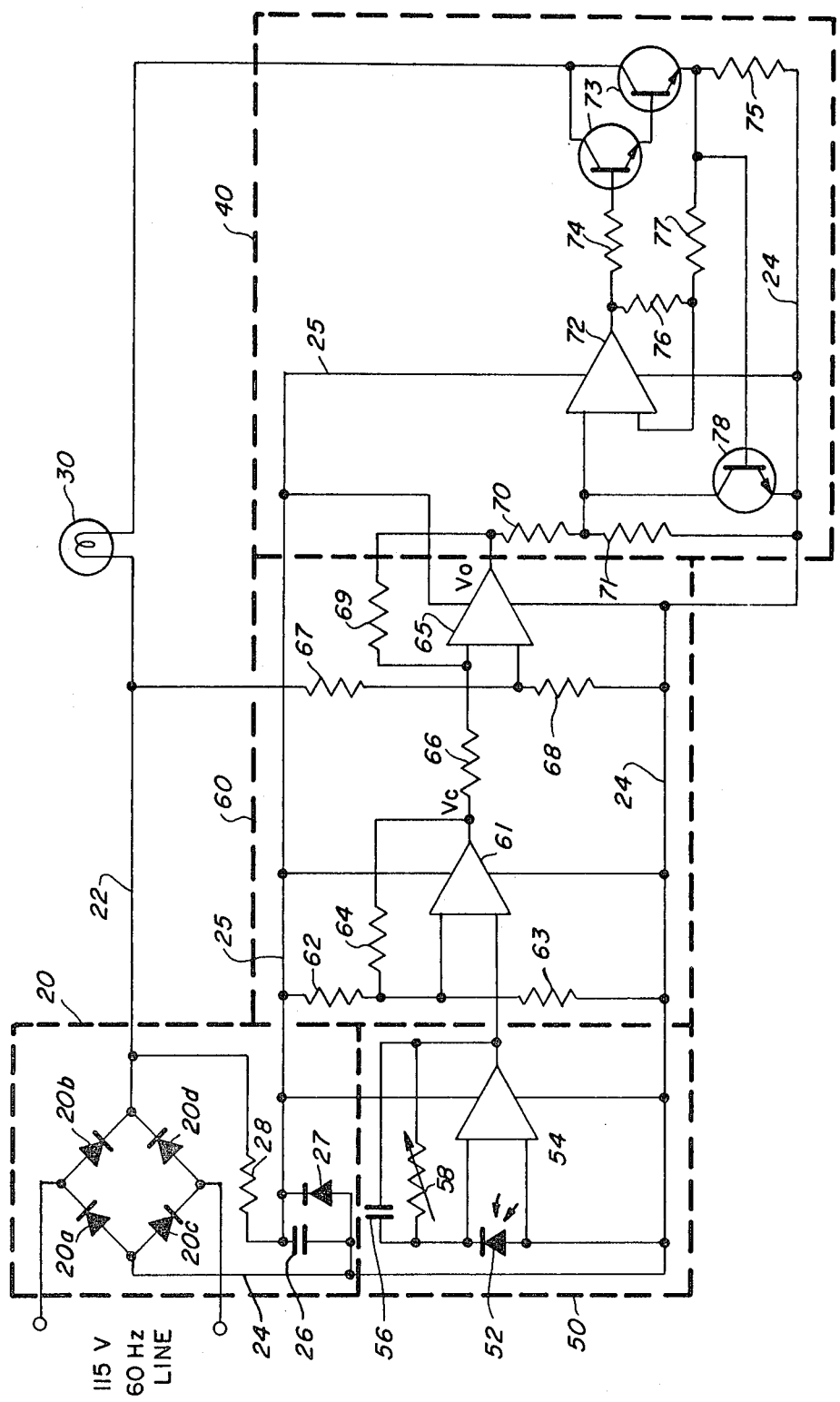
FIG. 4 is a detailed schematic diagram of a second embodiment of the FIG. 1 system.

Referring now to FIG. 4, the circuit of FIG. 2 has been modified by introducing an additional amplifier in the trigger circuit and using the Darlington transistor as the output. The circuit operates in the same manner as described above producing voltage $V_o$ at the output of comparator-amplifier 65. This drive voltage is divided down by resistors 70 and 71 to provide a low-level, control voltage to amplifier 72. Amplifier 72 drives Darlington transistor pair 73 via resistor 74 so that the current from lamp 30 causes a voltage drop across resistor 75 equal to the control voltage. The voltage gain of amplifier 72, as set by resistors 76, 77, equals 150, so that sufficient base-drive voltage will always be present to operate transistor pair 73, regardless of its current gain. Transistor 78 serves the same function as transistor 43 in FIG. 2. It is therefore seen that, since the output signal $V_o$ is an approximate representative of the desired output current, the introduction of high gain closed loop transconductance (voltage to current converter) amplifier 72 removes the undesirable effects of current gain changes in the Darlington transistor.

Specific values for the transistor switch of FIG. 4 are listed below:

| FIG. 4(Switch 40)Components | |
|---|---|
| Amplifier | 72 LM 324 |
| Transistor | 73 TIP 160 |
| | 78 2N 3904 |
| Resistors | 70 33K, (all ¼W) |
| | 71 4.7K |
| | 74 200 |
| | 75 0.1Ω, 1W |
| | 76 330K |
| | 77 2.2K |

From the above, it is seen that the lamp has been phased into a normal operating mode by controlling lamp turn-on and turn-off via a transistor switching circuit thereby reducing the electromagnetic affects associated with the more rapid SCR turn-on techniques.

While the above description has described a circuit wherein the load is a tungsten lamp, the principles of the present invention are applicable to the application of power to other types of loads such as radiant heaters, for example, of the type used to fuse xerographic images on a recording sheet. In this case, a sensing element which detects radiant heat emanating from the fuser could be used in place of the photodiode.

We claim:

1. A phase-controlled power supply circuit for providing regulated dc power to a radiant energy-producing load, said power supply circuit adapted to compensate for the effects of rapid power fluctuations in the ac input line source, said circuit comprising:

rectifier means for converting ac input voltage to full wave rectified dc voltage, means for generating a first output signal $V_c$ representative of the radiant energy emanating from said load, said generating means including a photosensing device which generates a current proportional to the radiant energy from the load impinging thereon, a first amplifier for converting said current into a voltage output $V_2$ and a second amplifier for amplifying output $V_2$ to generate output signal $V_c$, means for comparing output $V_c$ with a portion of the rectified dc voltage to produce a second output $V_o$, said comparing means comprising a third amplifier means for comparing the signal $V_c$, received at the negative input of said third amplifier with a portion of the rectified dc voltage received at the positive input of said third amplifier, and a transistor switching circuit coupled between said comparing means and said load, said switching circuit being adapted to be turned on and off at a rate determined by the rate of change of the level of signal $V_o$, whereby the load is turned on and off at a rate consistent with the switching circuit.

2. The power supply circuit of claim 1 wherein said load is a tungsten lamp and said sensing device is a photodiode.

3. The power supply circuit of claim 1 wherein said transistor switching circuit includes a Darlington transistor.

4. The power supply circuit of claim 3 wherein said switching circuit further includes a high gain closed loop transconductance amplifier connected between said comparator means and said Darlington transistor.

* * * * *